Nov. 4, 1930.  D. J. JONES  1,780,393
SYSTEM OF PRESSURE AND TEMPERATURE REGULATION FOR HEATERS
Filed May 24, 1929
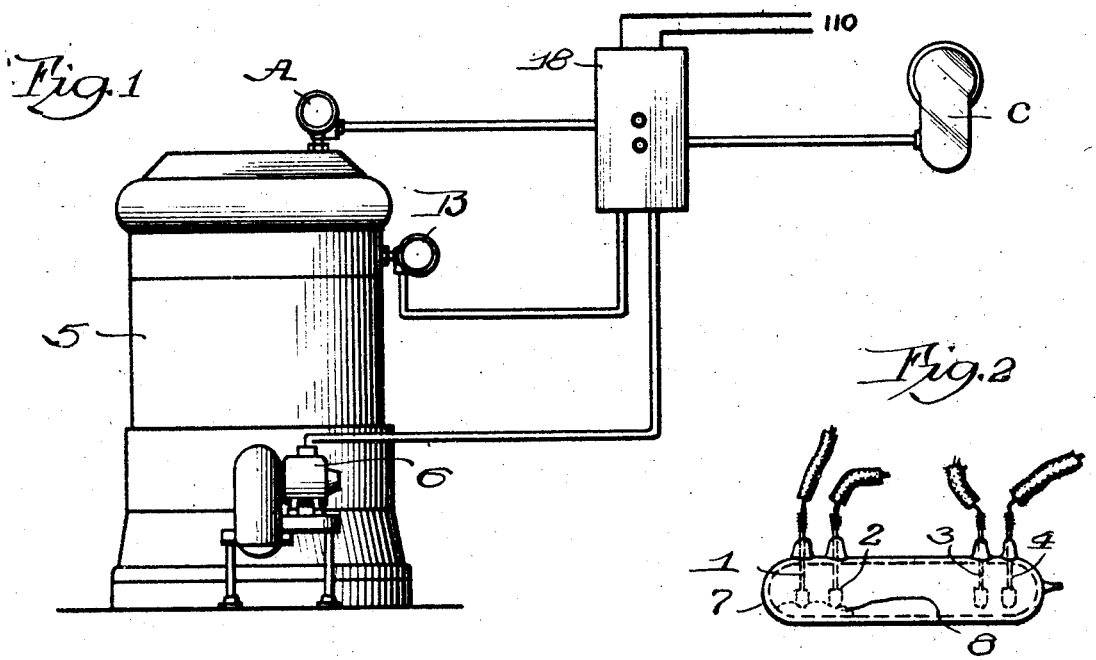
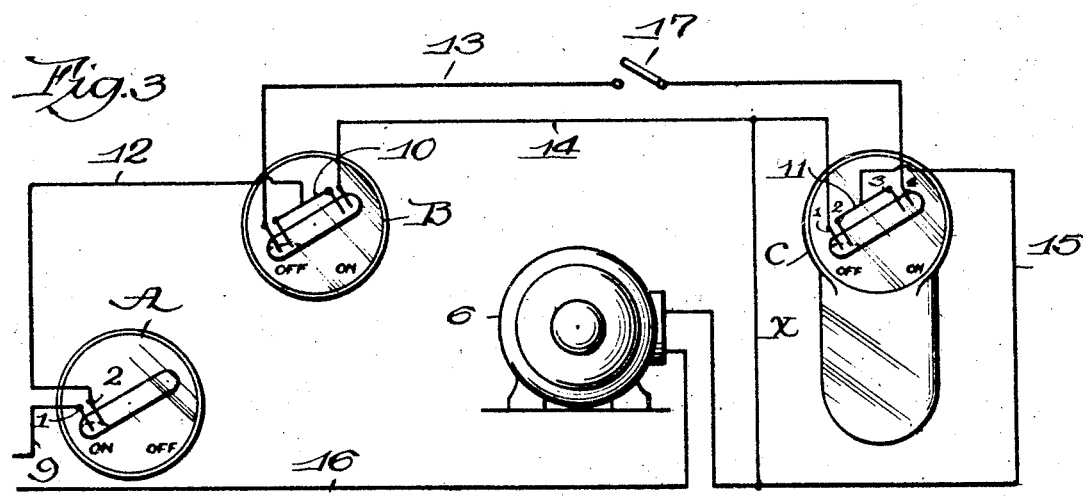
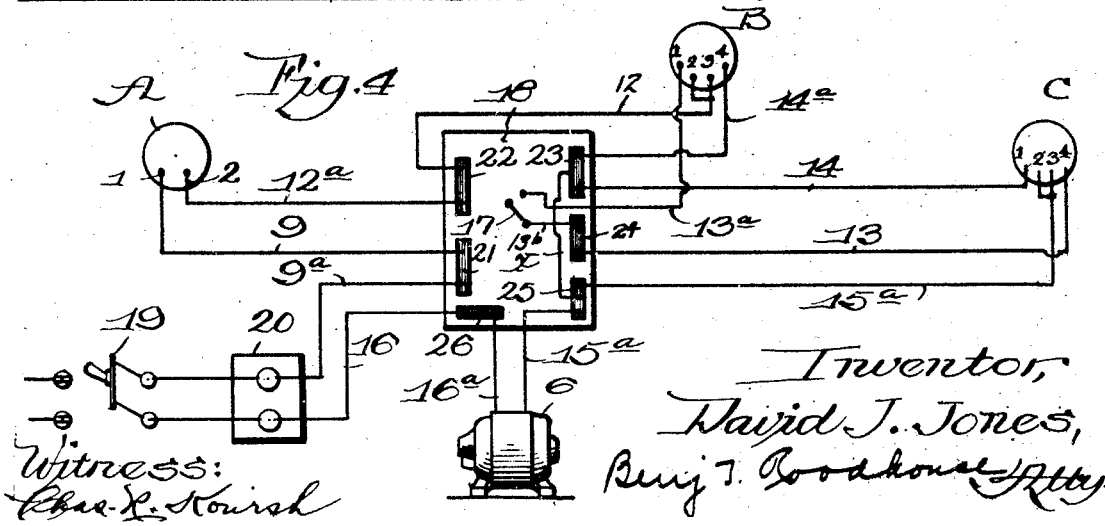

Patented Nov. 4, 1930

1,780,393

UNITED STATES PATENT OFFICE

DAVID J. JONES, OF CHICAGO, ILLINOIS, ASSIGNOR TO BELL & GOSSETT COMPANY, OF CHICAGO, ILLINOIS, A CORPORATION OF ILLINOIS

SYSTEM OF PRESSURE AND TEMPERATURE REGULATION FOR HEATERS

Application filed May 24, 1929. Serial No. 365,700.

My present invention relates to the provision of a plurality of circuit controlling instrumentalities, such as pressure and temperature operated circuit opening and closing devices, in a circuit with a heat producing means, such as a blower in an oil or gas burner or stoker, whereby the heater or boiler water will be maintained at a predetermined minimum, the boiler will be protected against excessive pressure or heat and the instrumentality will also respond to the heat requirements of the premises that it is designed to heat. Such devices have been associated with heaters for the same purpose, but, so far as is known, in other and more complicated circuits. In the circuit herein described, as will be hereafter seen, the circuit closed through the thermostat passes through the respective instruments so that not only is the apparatus controlled as desired, but also the parts may be tested and supervised by a manipulation of the thermostat as each part has to harmoniously function to maintain the heater in operation. For the purpose of simplifying the practical employment of my invention I have provided a terminal board which may be installed in a convenient location and to which the several instrumentalities may be easily wired.

I have illustrated my invention in the accompanying drawings in which—

Fig. 1 is a diagrammatic illustration of a boiler associated with an oil heater, a pressurestat, an aquastat and room thermostat and my terminal panel with the wiring leading therefrom to the respective elements.

Fig. 2 is a schematic illustration of a mercury switch, the part of the pressurestat, aquastat and room thermostat which is included in my circuit.

Fig. 3 is the diagram of my circuit, and

Fig. 4 is a diagram of the wiring including the terminal panel.

Similar reference characters refer to similar parts throughout the several views.

In Fig. 1 the boiler 5 is shown provided with a form of oil burner operated by a motor 6. The boiler is provided with a pressurestat A, the purpose of which is to open the motor circuit when the pressure reaches a predetermined point, which, for heating, would not be over 10 pounds. The boiler is also provided with an aquastat B, the purpose of which in my circuit is to maintain the boiler water at a predetermined temperature below steam or vapor producing temperatures. The system also includes a room thermostat C located in some suitable portion of the premises, the purpose of which is to close the circuit when the temperature of the premises falls below a predetermined point, said 70° Fahrenheit, and to open the circuit when the temperature of the premises has reached the desired predetermined temperature. Pressurestats, aquastats and thermostats may be obtained in the market provided with the circuit opening and closing mercury switch shown in Fig. 2. Other instrumentalities for accomplishing the same purpose may be employed in the practice of my invention, but as the device here shown is economical, positive and dependable, I have illustrated it as a simple means of carrying out my invention. This mercury switch comprises a sealed tube 7 containing a small quantity of mercury 8. Two pairs of terminals 1 and 2 and 3 and 4 are fused into one of the walls of the tube 7 at either end thereof so that when the tube 7 is tipped in either direction either the interior ends of the terminals 1 and 2 or 3 and 4 will be submerged in the mercury thereby closing the circuit in which the outer end of these terminals are included.

As seen most clearly in Fig. 3 the terminals 1 and 2 of the mercury switch employed in the pressurestat A are alone included in my circuit. One of the supply conductors 9 connects with terminal 1 of the pressurestat A. Terminals 2 and 3 of the switches of the aquastat B and thermostat C are wired together by conductors 10 and 11. A conductor 12 connects terminal 2 of the pressurestat A with conductor 10 of the aquastat B. Conductor 13 connects terminal 1 of the aquastat B with terminal 4 of the thermostat C and conductor 14 connects terminal 4 of the aquastat B with terminal 1 of the thermostat C. Conductor 11 is connected by conductor 15 with a pole of the motor 6 and the supply conductor 16 connects with the other pole of the motor. The switch of the pressurestat A closes when the mercury submerges the ends of terminals 1 and 2 and remains in that position until the pressure in the boiler exceeds the predetermined amount for which the instrument is set.

The switch in the aquastat B closes the circuit when its terminals 3 and 4 are submerged in the mercury, and after the boiler water has reached the predetermined heat, say 180° or 190° Fahrenheit, for which the instrument is set, assumes the position shown in Fig. 3, in which terminals 1 and 2 are submerged in the mercury and terminals 3 and 4 are disconnected.

When the temperature in the premises drops below the desired point at which point the thermostat C is adjusted, the tube 7 of the thermostat shifts to submerge the terminals 3 and 4, thereby closing the circuit, and when the temperature of the premises has risen to the required amount, the tube 7 shifts to uncover the terminals 3 and 4 and to submerge the terminals 1 and 2, which latter position is shown in Fig. 3.

To initially fire the boiler employing the circuit thus far described the oil burner is lit and the thermostat C shifted to close terminals 1 and 2. When the boiler water has reached its predetermined temperature, the tube 7 of the aquastat B shifts to the position shown in Fig. 3 and the thermostat is adjusted to the temperature it is desired to maintain in the premises. Thereafter the system is fully automatic, the boiler water temperature being maintained at a desired minimum and additional firing secured to maintain the premises at a desired temperature.

The pressurestat A is set at a point where except when unexpected pressure is inadvertently developed it only opens after the requirements of the aquastat B and thermostat C have been met. When the aquastat B calls for heat the circuit closes through terminals 1 and 2 of A, terminals 3 and 4 of B and terminals 1 and 2 of C. When the thermostat C calls for heat the circuit closes through terminals 1 and 2 of the pressurestat A, terminals 1 and 2 of the aquastat B and terminals 3 and 4 of thermostat C.

It will be noted that in the circuit thus far described, if the aquastat and thermostat should assume positions calling for heat at the same time the circuit would be opened and as firing would be discontinued heat would not be generated so as to cause either of these instrumentalities to assume an off position. Such a condition is not at all likely to arise in practical operation, but to maintain the system in operation even upon the development of such a condition I employ the conductor X connecting conductors 14 and 15. When conductor X is employed in my circuit aquastat B may close independently of the position of thermostat C which will insure the firing of the boiler until aquastat B is in off position. Thermostat C cannot close the circuit until aquastat B has opened, but there will be no occasion for it to function until aquastat B is opened as the aquastat will be causing the firing of the boiler until it is in off position.

Inasmuch as boilers such as are here contemplated are often employed for heating a service hot water supply throughout the year and it may be desired to eliminate the thermostat from the system in the summer season, I have interposed the switch 17 in conductor 13, which will prevent the system responding to the thermostat but leave it otherwise in operation.

In Fig. 4 I have illustrated a terminal panel 18 and wiring diagram suitable for the practical employment of my circuit and system. This diagram shows a single throw double pole switch 19 and fuse box 20 which are usually required by the local ordinances. The panel 18 is provided with suitably arranged lengths of buss bar 21, 22, 23, 24, 25 and 26. One fuse is connected by the conductor 9$^a$ with the buss bar 21. The buss bar 21 is connected by the conductor 9 with the terminal 1 of the pressurestat A. The terminal 2 of the pressurestat is connected through the conductor 12$^a$ with the buss bar 22. The buss bar 22 connects through the conductor 12 with terminals 2 and 3 of the aquastat B. Terminal 1 of the aquastat B connects through the conductor 13$^a$ with the pole of the switch 17. The opposite pole of the switch 17 connects through conductor 13$^b$ with the buss bar 24, which connects in turn with terminal 4 of thermostat C. Terminal 4 of aquastat B connects through conductor 14$^a$ with buss bar 23 which in turn connects through conductor 14 with terminal 1 of thermostat C and terminals 2 and 3 of thermostat C connect through conductor 15$^a$ with buss bar 25, which in its turn connects through conductor 15$^a$ with a pole of the motor 6, the opposite pole of which motor connects through conductor 16$^a$ with buss bar 26, which in its turn connects through conductor 16 with the opposite fuse of fuse box 20.

From the foregoing description taken in connection with the drawings it will be seen that I have provided a system of boiler supervision and control which will prevent the boiler from being fired to secure an excessive pressure, which will maintain the boiler water at a predetermined minimum temperature and which will respond to the heat requirements of the premises the installation is designed to heat, in which system the circuit closes through the respective control instrumentalities, thereby assuring the users of the system that the instrumentalities in question are functioning.

Having described my invention what I claim as new and desire to secure by Letters Patent is:

1. In combination a boiler having firing means therefor, a system of pressure, boiler water temperature and premises temperature control, comprising a circuit including in series the pressurestat, aquastat, thermostat and firing means, and a branch circuit paralleling said thermostat running from said aquastat to said firing means.

2. In combination a boiler having firing means therefor, a system of pressure, boiler water temperature and premises temperature control, comprising a circuit including in series the pressurestat, aquastat, thermostat and firing means with a three way wiring between said aquastat and thermostat.

3. In a system of pressure, boiler water temperature and premises temperature control, switches for the boiler water and premises temperature control having pairs of terminals respectively closed in on and off positions, a terminal of each switch of each pair being connected together and to terminals of a circuit and the other terminals of said switches being connected in parallel.

4. In a system of pressure, boiler water temperature and premises temperature control, switches for the boiler water and premises temperature control having pairs of terminals closed respectively in on and off positions, a terminal in each position of each switch being connected together and to the terminals of a circuit and the other terminals of said switches being connected in parallel and a terminal panel to which the several elements of said system are wired.

5. In a system of pressure, boiler water temperature, and premises temperature control, switches for the boiler water and premises temperature control having pairs of terminals closed respectively in on and off positions, a terminal in each position of each switch being included in a circuit, the other terminals of said switches being connected in parallel, and a conductor connecting the conductor between a terminal of the on position of the aquastat and a terminal of the off position of the thermostat with the circuit beyond said thermostat.

6. In combination a boiler having firing means therefor, a system of pressure boiler water temperature and premises temperature control, comprising a circuit including a two terminal mercury pressure operated switch, a four terminal mercury boiler water temperature operated switch, a terminal of each pair being connected with said pressure operated switch, and a premises temperature operated mercury switch, one of the free terminals of said boiler water temperature operated switch being in series with said premises temperature operated switch and said firing means, and the other free terminal of said boiler water temperature operated switch being connected with said firing means in parallel with said premises temperature operated switch.

7. In combination a boiler having firing means therefor, a system of pressure boiler water temperature and premises temperature control, comprising a circuit including a two terminal pressure operated switch, a four terminal boiler water temperature operated switch, a terminal of each pair being connected with said pressure operated switch, and a premises temperature operated switch, one of the free terminals of said boiler water temperature operated switch being in series with said premises temperature operated switch and said firing means, and the other free terminal of said boiler water temperature operated switch being connected with said firing means in parallel with said premises temperature operated switch.

8. In combination a boiler having firing means therefor, a system of high limit and low limit boiler water temperature control and premises temperature control, comprising a circuit including a two terminal high limit control switch, a four terminal low limit control switch, a terminal of each pair being connected with said high limit control switch, and a premises temperature operated switch, one of the free terminals of said low limit control switch being in series with said premises temperature operated switch and said firing means, and the other free terminal of said low limit control switch being connected with said firing means in parallel with said temperature operated switch.

DAVID J. JONES.